Patented Oct. 2, 1951

2,569,767

UNITED STATES PATENT OFFICE 2,569,767

DENTAL MATERIAL AND METHOD

Frances E. Knock, Oak Park, Ill., assignor to The L. D. Caulk Company, Milford, Del., a corporation of Delaware No Drawing. Application May 27, 1946,
Serial No. 672,682

9 Claims. (Cl. 32—2)

This invention relates to a dental material and method and more particularly to an improved material and method for dental restorations including the fabrication of dentures and denture reliners and the production of direct filling material and also dental adhesives.

The dental materials in accordance with the present invention, as initially prepared, range from a viscous liquid in the case of a dental adhesive or a putty-like material for denture reliners and dentures to a plastic material having the consistency of a thick dough for direct filling material. All of these materials are similar in composition and all have certain properties in common, for example, they are all compounded from one or more solid finely divided polymers and one or more liquid polymerizable monomers, the monomer portion of the composition forming at least a partial solvent for the polymer portion. They all rapidly harden to a hard, tough, non-porous material by polymerization of the monomer component of the composition. Furthermore, they are all characterized by the substantial absence of volatile organic solvents.

Dental material for denture reliners, direct filling materials and dental adhesives containing polymerized material have heretofore frequently contained substantial amounts of volatile organic solvents for the polymer. Hardening of such dental material in situ in the patient's mouth has been by reason of evaporation of the volatile solvent or leaching of the solvent from the dental material by the mouth fluids or both. The removal of the solvent from the residual solid polymer has caused shrinkage of this material so that it has been difficult or impossible to secure adequate adhesion to the teeth or denture or to accurately produce the desired shapes in the case of fillings or denture reliners. Also, the removal of the solvent has caused the residual solid polymer to develop pronounced porosity which not only detracts from the appearance of the material but results in a rapid collection of foreign organic material in the pores with consequent fouling of the denture or other restoration. Furthermore, in the case of denture reliners, penetration of the volatile solvent into the material of the denture base causes definite weakening of the base.

When fabricating dentures, the molding and hardening of the denture material is carried out in molds prepared by first taking impressions of the patient's mouth with various impression materials and then constructing molds in accordance with known procedure. The most successful of the previously employed compositions for dentures have, however, been slow to harden and have required at least several hours treatment at elevated temperatures to convert the material from a plastic form to a hard structurally strong material.

In accordance with the present invention, it has been found that dichlorostyrene monomer, particularly when in admixture with one or more other polymerizable monomers, forms an excellent solvent or partial solvent for any one of a large number of solid polymers including copolymers or mixtures of such polymers for the production of dental materials which harden rapidly at mouth temperature by polymerization of the monomer content of the composition. By selecting suitable polymers or mixtures of polymers of the correct molecular weight and employing dichlorostyrene monomer or mixtures of this material with other suitable monomers in various proportions, dental materials ranging from a viscous liquid for dental adhesives or a putty-like material for denture reliners or dentures to a thick dough for direct filling material can be prepared, all of which remain in substantially their original form for sufficient length of time for application but which thereafter harden rapidly at mouth temperature. In the case of denture materials, the rapid hardening can be hastened by employing temperatures somewhat above mouth temperature to produce hardened dentures in a fraction of the time heretofore found necessary. In the case of plastic materials such as those employed for denture reliners or direct filling, the materials take an initial set after a few minutes due to partial solution of the polymer component in the monomer component. This initial set is followed by the hardening referred to, the latter resulting from polymerization of the monomer component. The initial set also occurs in the case of dental adhesives when the adhesive is employed to bond dental restorations such as acrylic inlays where at least one surface being bonded is formed from a polymer which is at least partly soluble in the monomer component of the adhesive.

Dental materials for introduction into the mouth of a patient must be substantially tasteless or have a pleasant taste both in their unhardened form and in their final form and they must be non-toxic under conditions of use and non-irritating to the mouth tissues. In these respects, dichlorostyrene is an excellent material as it is substantially tasteless, non-toxic under conditions of use in the mouth and does not irritate the mouth tissues. It retains these qualities in admixture with other monomers and polymers which themselves meet such requirements and has a masking effect on such other materials as tend to have a disagreeable taste. The preferred polymer for employment in the present invention is a finely divided solid methyl methacrylate polymer although as discussed at length below, many other polymers are capable of being employed both alone and in admixtures, including polymers of dichlorostyrene.

It is therefore an object of the invention to provide an improved dental material capable of being employed for many dental purposes including the fabrication of dentures and denture reliners and for direct filling materials and dental adhesives.

Another object of the invention is to provide an improved dental material which is free of volatile organic solvents and rapidly hardens at mouth temperature by polymerization of a polymerizable monomer component thereof.

Another object of the invention is to provide an improved material for making denture reliners which can be formed into the desired shape by slight pressure between the denture and the surfaces of the mouth tissues and which rapidly initially sets to the desired shape and thereafter rapidly hardens into a non-porous rigid material at mouth temperature without substantial shrinkage.

Another object of the invention is to provide an improved material for dental adhesives in the form of a viscous liquid which rapidly hardens at mouth temperature and tenaciously adheres to teeth and dental restorations.

Another object of the invention is to provide an improved material for direct filling material which can be prepared in the form of a thick dough and which rapidly hardens after application without substantial shrinkage into a material adhering to the teeth and capable of being smoothed or ground after hardening.

A further object of the invention is to provide an improved material for dentures which can be prepared in the form of a plastic material adapted for molding operations and which rapidly hardens to a non-porous rigid material under moderately elevated temperatures, conforming accurately to the mold cavity so as to enable the production of dentures in a fraction of the time heretofore found necessary.

A still further object of the invention is to provide an improved method of making dental restorations in which hardening of a dental material is accomplished by polymerization of a monomer component including dichlorostyrene.

Other objects and advantages of the invention will appear in the following description of preferred embodiments thereof.

Dichlorostyrene monomer is particularly suitable for producing the dental materials of the present invention. Dichlorostyrene has a styrene nucleus in which two of the hydrogens of the ring have been substituted with chlorine. Various isomers of dichlorostyrene are possible and this material is available on the market as a mixture of various isomers. One commercial mixture suitable for the present invention has a composition approximately as follows:

5% 2-6 isomer
40% 2-5 isomer
40% 2-4 isomer
15% other isomers

In the above list, the figures following the percentage marks refer to the position of the chlorine atoms on the ring. Of these isomers, the 2-5 isomer exhibits the most rapid polymerization, the 2-4 isomer being next and having almost the same rapidity of polymerization. The 2-6 isomer has perhaps the lowest rate of polymerization of any of the isomers. As rapid polymerization is an attribute of monomers employed in the present invention, a substantially pure 2-5 isomer or a mixture of this material with the 2-4 isomer is preferred although commercial mixtures such as discussed above have a sufficiently great rate of polymerization. The lesser the amount of 2-6 isomer or other slow polymerizing isomers in the mixture, the better the results. Dichlorostyrene, either in a commercial mixture of isomers or the individual isomers themselves, is substantially tasteless, non-toxic and non-irritating to the mouth tissues when employed in accordance with the present invention.

In general, admixtures of dichlorostyrene monomers with other rapidly polymerizable monomers frequently have a greater rate of polymerization than either of the monomers alone. The dichlorostyrene is, therefore, preferably employed in admixture with at least one other monomer which copolymerizes therewith and there are an extremely large number of such monomers capable of being employed with dichlorostyrene. In some cases, other monomers individually having a much lower rate of polymerization than dichlorostyrene produce a mixture having a polymerization rate greater than dichlorostyrene alone. Even monomers which have relatively high molecular weights and are in viscous liquid or solid form may sometimes be dissolved in dichlorostyrene monomer to yield a liquid monomer component and increase the polymerization rate of the dichlorostyrene. The possible monomers for copolymerization with dichlorostyrene monomer will be discussed at length below, the specific disclosure in this application being directed to the preferred monomers. The preferred other monomers for admixture with dichlorostyrene monomer are methyl methacrylate, ethyl ester of butadiene-2-carboxylic acid, methylene diethyl malonate, alpha methylene ethyl acetoacetate, N-butyl maleinimide, and vinyl acetate.

The preferred polymer for admixture with the monomer component is a methyl methacrylate polymer. The extent of polymerization of this material will vary with the purpose for which the dental material is to be employed. Thus, for dentures, a relatively high molecular weight polymer, for example, one having an index of refraction of $n_D^{25}$ 1.50 or greater will ordinarily be employed, while for denture reliners and direct filling material a relatively low molecular weight polymer, for example, one having an index of refraction in the neighborhood of $n_D^{25}$ 1.484, is suitable. For dental adhesives, a polymer having an extent of polymerization intermediate between that suitable for dentures and denture reliners can advantageously be employed. In all cases, the polymer is preferably employed in finely divided form, for example, of a particle size under approximately 50 microns and preferably in a range between approximately 10 and 20 microns. For dental adhesives, a somewhat larger proportion of the monomer component is employed than is the case for the other dental materials discussed above and the particles of the polymer should be completely dissolved in the monomer portion of the admixture. For dental materials which are semi-solid in their initial form, incomplete solubility of the polymer particles in the monomer is desired and the proportions of monomer to polymer are somewhat less. The extent of polymerization of the polymer will also depend upon the nature of the polymer or mixtures of polymers employed and upon the precise compositions of the monomer component. In other words, different monomers or monomer mixtures have varying solvent powers for different polymers and, in general, the greater the degree of polymerization of a given polymer, the less its solubility in a given monomer component.

It is to be understood that the index of refraction given above for methyl methacrylate polymer is individual to such polymer and that other polymers having the same solubility and other properties may have considerably different indexes of refraction. For best results, even the extent of polymerization of methyl methacrylate polymers intended for a given dental use will vary with different monomer components employed therewith although, in general, the extent of polymerization will be in the neighborhood of the values given above. It is quite often possible to vary the consistency or physical form of the initially prepared admixture by employing an admixture of polymer powders of the same type of polymer but carried to different extents of polymerization or to employ admixtures of different polymers having different solubilities in the monomer component employed. Thus, a mixture of a polymer having slight solubility in the monomer with a polymer having somewhat greater solubility will frequently give the desired consistency when a single polymer having the same solubility characteristics throughout is not effective. Somewhat the same result may also sometimes be accomplished by employing a mixture of different size particles of the same polymer or different polymers.

Dichlorostyrene monomer or mixtures of this material with other rapidly polymerizable monomers will polymerize at ordinary ambient temperatures. The monomer component must therefore be furnished to the dentist separately from the polymer and must contain a suitable polymerization inhibitor. Many polymerization inhibitors are known and examples of such inhibitors suitable for dichlorostyrene and mixtures of dichlorostyrene and other polymerizable monomers are hydroquinone and ditertiary butyl catechol although the present invention is not to be limited to these inhibitors. These inhibitors must be removed from the monomer component by the dentist or technician prior to admixture with the polymer powder to form the dental material. In my copending application Serial No. 672,681, filed May 27, 1946, now abandoned, I have disclosed a simple apparatus and method for removing a polymerization inhibitor from a monomer liquid by flowing the monomer through an adsorbent such as alumina. Such apparatus includes a tube containing an elongated column of powdered adsorbent for the inhibitor, the amount of adsorbent being sufficient to remove inhibitor from the maximum amount of monomer which the dentist or technician is likely to employ at any one time. Immediately after the inhibitor has been removed from the monomer, the monomer and polymer powder are admixed as more specifically described with respect to specific examples hereafter given. A small amount of a polymerization catalyst is incorporated in the admixture and the composition is then ready for use. The removal of the inhibitor and the mixture of the various ingredients are simple operations capable of being easily carried out by any dentist or technician.

In general, the polymer will be furnished in the form of a powder in suitable containers and the necessary amount of polymerization catalyst will ordinarily be incorporated with the polymer. The monomer component will also be furnished in suitable containers along with adsorbent containers for removing the inhibitor from the monomer. For dentures and denture reliners, the polymer powder will ordinarily be tinted to match the color of the gum tissues by any suitable or known coloring operation, a preferred material for this purpose being a mixture of clear and tinted particles. For direct filling material and dental adhesives, the polymer will ordinarily be tinted to match the color of the teeth. A preferred manner of marketing the dental materials of the present invention is to supply packages for dental restoration operations having associated therein individual containers, one carrying polymer powder admixed with catalyst and another carrying monomer liquid, the amounts of these materials being governed by market conditions. Since the monomer liquid contains a polymerization inhibitor, the monomer package will also preferably include an inhibitor removing element such as the adsorbent packed tube described above.

DENTURE RELINERS

When initially admixed, the material used for relining dentures is a soft plastic material of about the consistency of putty and remains in this condition long enough for the dentist to spread the material upon the denture, take an impression of the mouth to be fitted and remove excess material. It has sufficient tackiness to adhere to the material of the denture but is not sufficiently tacky to adhere to the tissues of the mouth. It flows easily, i. e., is not too rubbery, in order to conform readily to the mouth. Thus, the particles of the polymer portion of the material must not be too soluble in the monomer component. Denture reliner material in accordance with the present invention takes an initial set after five or ten minutes in the patient's mouth so that it will not be readily distorted. It thereafter hardens by polymerization of the monomer content in a relatively short length of time, i. e., in a few hours or usually not more than a day and tenaciously adheres to the denture base.

As an example of a denture reliner material in accordance with the present invention, the following is given:

Example 1

A monomer mixture freed of inhibitor and made up of three grams of dichlorostyrene monomer of the isomer composition above given and one gram of methyl methacrylate monomer is spatulated with 0.08 gram of benzoyl peroxide as a catalyst and 7.2 grams of methyl methacrylate polymer of low molecular weight, for example, having an index of refraction of $n_D^{25}$ 1.484 and having a particle size under twenty microns. After about one or two minutes, the material is suitable for application to the denture, insertion into the patient's mouth and removal of excess material. It is allowed to remain in the patient's mouth for five or ten minutes, i. e., until it takes an initial set, and then removed and painted with a glaze of a slightly viscous solution of methyl methacrylate polymer in the methyl methacrylate monomer. A suitable methyl methacrylate polymer for this purpose is one having an index of refraction of $n_D^{25}$ 1.50. The glaze is allowed to dry in the air for at least three minutes, then rinsed with water, after which the denture is reinserted in the patient's mouth. Such a relined denture may be immediately worn by the patient and within twenty-four hours the monomer solvent will polymerize to produce a hard, tough, non-porous reliner which is tasteless and resistant to oral fluids.

Example 2

As another example of a material suitable for a denture reliner, an inhibitor-free mixture of three grams of dichlorostyrene and one gram of ethyl ester of butadiene-2-carboxylic acid is spatulated with 0.08 gram of catalyst and 6.8 grams of methyl methacrylate polymer of low molecular weight. This material is applied in exactly the same way as the material of Example 1 but the monomer polymerizes at a somewhat more rapid rate to form a hard, tough, non-porous reliner.

Example 3

As another example of a material suitable for a denture reliner, an inhibitor-free monomer mixture of three grams of dichlorostyrene and one gram of methyl methacrylate is spatulated with 0.08 gram of catalyst and seven grams of dichlorostyrene polymer of low molecular weight having a particle size between approximately ten and twenty microns. This material is also applied in exactly the same manner as the material of Example 1.

DIRECT FILLING MATERIAL

In general, direct filling materials are extremely similar in composition to denture reliner materials and the mixing operation is the same. Also, in general, the direct filling material is usually made somewhat stiffer in consistency than the denture reliner material by employing a somewhat greater ratio of polymer powder to liquid monomer.

Example 4

As an example of a material particularly suitable for direct filling, an inhibitor-free mixture of three grams of dichlorostyrene monomer and one gram of methylene diethyl malonate monomer is spatulated with 0.08 gram catalyst and 7.8 grams methyl methacrylate polymer of low molecular weight. After about two minutes, this material is in the form of a thick dough which is ready for use and may be inserted in tooth cavities by known procedures. As soon as the material has taken an initial set which occurs in five or ten minutes, the exterior surface can be smoothed, if necessary, and is then preferably coated with a glaze made up of a slightly viscous solution of methyl methacrylate polymer in methyl methacrylate monomer of the same character as that described with reference to Example 1.

The polymer employed for direct filling material is ordinarily tinted to match the color of the teeth. The material of the above example forms an esthetic, hard, tough filling within a few hours by polymerization of the monomer solvent at mouth temperature. The initial set of the material within five or ten minutes forms a material which is sufficiently hard to resist injury unless subjected to unusual stresses.

DENTAL ADHESIVES

The composition of dental adhesives in accordance with the present invention is also extremely similar to the compositions employed for denture reliners and direct filling material. The major difference is that the ratio of solid polymer powder to liquid monomer is substantially decreased so that a viscous liquid material is produced in the initial mixing operation. Also, a polymer having a somewhat greater extent of polymerization is ordinarily employed.

Example 5

As an example of a material suitable for a dental adhesive, a monomer mixture of three grams of dichlorostyrene and one gram of alpha methylene ethyl acetoacetate is thoroughly admixed with 2.5 grams of methyl methacrylate polymer, for example, by spatulating the powder and liquid together. This mixture is then heated moderately, for example, to a temperature of not over 100° C., until the powder dissolves in the liquid monomer. A viscous liquid results and just prior to use 0.08 gram of catalyst is added and thoroughly spatulated into the mixture. The liquid is then employed to coat both surfaces to be united after which the surfaces are pressed together and left in contact. When at least one of the surfaces to be bonded is formed from a polymer which is partially soluble in the monomer component of the adhesive, for example, when bonding acrylic inlays, bridges, etc., to teeth, the adhesive takes an initial set in five to ten minutes after the adhesive is applied. The adhesive is sufficiently adherent in this stage to hold the surfaces together under ordinary stresses and in the course of a few hours hardens by polymerization of the monomer component.

The adhesive described in the above example may be employed for substantially any desired cementing operation, for example, the cementing of almost any type of dental restoration such as inlays, bridges, crowns, porcelain facings, etc. It adheres tenaciously to natural or artificial teeth and to materials ordinarily employed in making dentures as well as to metals, porcelains, etc.

DENTURE MATERIAL

Denture material in accordance with the present invention likewise has a composition similar to those described above for denture reliners, direct filling material and dental adhesives. It is a moldable material of doughy consistency preferably having a consistency approximately the same or even stiffer than that employed for denture reliners.

Example 6

As an example of a material suitable for dentures, an inhibitor-free monomer mixture of eight grams of dichlorostyrene and three grams of N-butyl maleinimide is spatulated with fourteen grams of methyl methacrylate polymer, for example, a polymer having an index of refraction in the neighborhood of $n_D^{25}$ 1.50, and 0.08 gram of catalyst such as benzoyl peroxide. This material is inserted in a denture mold in accordance with known procedures. The material may then be heated in the mold to a moderately elevated temperature, for example, 140° F., for one hour to polymerize the monomer and produce a hard, tough denture. In contrast with the most successful of previous denture base materials employing polymerizable material, this is an extremely short length of curing time as previous dentures have usually required a minimum of five hours curing at 160° F. The lower temperature of 140° F. is a distinct advantage as it moderates the violence of the polymerization reaction and reduces the tendency toward volatilization of the monomer which would otherwise cause formation of bubbles and porosity in the denture. If necessary, curing can be accomplished in an even shorter time by elevating the curing temperature, for example, to 160° F. or in a longer time at a lower temperature.

*Example 7*

As an example of a material suitable for a denture base material, an inhibitor-free monomer mixture of seven grams of dichlorostyrene and three grams of vinyl acetate is spatulated with twenty-one grams of methyl methacrylate polymer powder having an index of refraction similar to that employed in Example 6 and 0.08 gram of catalyst and placed in a suitable mold. This material may be cured to polymerize the monomer and produce a hard, tough resistant denture base by heating for one and a half hours at 158 to 160° F.

The polymer powder employed for denture base material as well as denture reliners will ordinarily be tinted, for example, by employing a mixture of tinted polymer particles with clear polymer particles to match the color of the gum tissues of the mouth. A material exactly the same as that described above in Examples 6 and 7 may be employed to mold teeth by employing suitably tinted polymer powder. Also, the polymer powder ordinarily used in dental adhesive and direct filling materials will be suitably tinted. In certain of the examples, a glaze in the form of methyl methacrylate polymer in solution in methyl methacrylate monomer is specified but it is to be understood that various other polymers or copolymers in solution in monomers may be employed for the same purpose.

In any of the above examples, the dichlorostyrene polymer employed in Example 3 and the methyl methacrylate polymer specified in most of the examples can be employed substantially interchangeably. Other methacrylates such as ethyl methacrylate and butyl methacrylate may be employed in whole or in part for the polymer and mixtures of any of the polymers mentioned above may likewise be employed. Various copolymers made of mixtures of the monomers corresponding to the above polymers may also be employed. Similarly, the various monomers employed in admixture with dichlorostyrene monomer in the above examples can be used substantially interchangeably in any of the examples given or dichlorostyrene may be employed alone. As stated above, mixtures of monomers including dichlorostyrene frequently polymerize at a greater rate than dichlorostyrene alone, itself a very rapid polymerizing material, and in such monomer mixtures, the amount of dichlorostyrene may range from approximately 5 to 95%, the other monomer or mixture of monomers likewise ranging from 5 to 95%. Other monomers which give excellent results in admixture with dichlorostyrene are alkyl esters of butadiene-2-carboxylic acid in addition to the ethyl ester mentioned above, and similar esters of methylene malonic acid or methylene acetoacetic acid, all of which give monomer mixtures with dichlorostyrene having rapid polymerization rates. For satisfactory results, the rate of polymerization of the monomer mixture into a hard, tough polymerized material at mouth temperature should be such that the material has set fairly hard in a few hours and in no case should the polymerization require in excess of two days.

In all cases, a polymerization catalyst is desirable to speed up the polymerization reaction and the preferred catalyst in any of the above examples is benzoyl peroxide. There are, however, other suitable catalysts for this purpose, for example, tertiary butyl perbenzoate, tertiary butyl hydroperoxide and lauroyl peroxide. The amount of catalyst will usually range between 0.1 and 5% depending upon the particular monomer mixture and catalyst employed as well as the desired rate of polymerization.

As a general disclosure of materials usable as the polymer after polymerization to a polymer of low molecular weight either alone or in various admixtures or as part of a copolymer or as a monomer in admixture with dichlorostyrene monomer for copolymerization therewith, suitable materials include vinyl compounds of the type

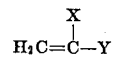

where either X or Y can be hydrogen but both cannot be. X and Y may also be $COCH_3$, $COOH$, $COOR$, $CONHR$, $CONRR$, $OCOR$, $CN$, $OR$ or any of the halogens (chlorine, bromine, iodine or fluorine). X and Y may also be alkyl, alkenyl or alkynyl, cycloaliphatic, aralkyl and aryl groups, unsubstituted or substituted with the hydroxyl group or any of the other aforementioned groups. R also represents alkyl, alkenyl or alkynyl, cycloaliphatic, aralkyl and aryl groups unsubstituted or substituted with hydroxyl or any of the other substituents represented by X and Y. In compounds containing more than one R, these R's may be the same or different.

Other monomers which may be employed with dichlorostyrene or polymerized to form all or a part of the polymer of the dental material include substituted vinyl acetylenes and butadienes of the structures

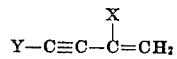

and

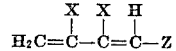

respectively, where X and Y retain their above significance. It has been found that polymerization is most rapid when Z is hydrogen but it may also be the same type of substituent as X and Y.

The polyhydric alcohol and phenol polyesters or acid esters of the unsaturated acids included above may also be employed, as well as the polyglycol diesters and the anhydrides of the same acids. Esters of saturated and unsaturated alcohols and acetylene monocarboxylic acids as well as polybasic unsaturated acids such as maleic, fumaric and acetylene dicarboxylic acid can be employed. Substituted maleic and fumaric acid esters and anhydrides may be employed as well as compounds of any of the aforementioned acids with polyvalent metals such as calcium, magnesium, aluminum, chromium, iron, tin, silicon and boron. Unsaturated polyhydric ethers of polyhydric alcohols may also be employed.

In addition, substituted maleinimides of the structure

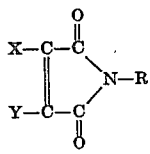

or

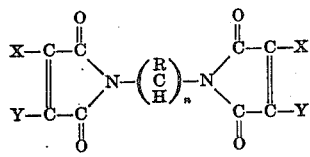

where $n$ may be a whole number from one to twenty can be employed. Also,

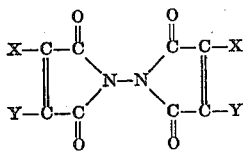

itself can be employed as well as maleinimides formed from amino groups on substituted or unsubstituted carbon chains which may contain also elements other than carbon, such as oxygen, in the chain. With the maleinimides, satisfactory results are obtained even if both X and Y are hydrogen.

Very satisfactory results can be obtained by employing a combination of one or more of the above monomers with dichlorostyrene monomer to form the monomer component of the dental material or one or more polymers or copolymers of the above monomers for the polymer component of the dental material. This allows maximum latitude in selecting materials satisfactory from the point of view of dissolving the polymer used with the monomer to the required extent and in the required length of time and for securing a desired polymerization rate.

In the preferred method of carrying out the invention, a finely powdered clear or tinted polymer is provided for use with the monomer combination. This polymer may be selected from the above list or it may be the polyvinyl ethers or acetals; the polyvinyl chlorides or polyvinyl chloride-acetate copolymers or modifications of these; cellulose ethers and nitrocellulose; or cellulose esters or mixed esters, rosin and its derivatives and coumarone indene polymers, or combinations or copolymers of these, which are at least partly soluble in the monomer combination used. Very satisfactory results are obtained by combining various low molecular weight polymers with their higher molecular weight polymers to give a mixture of polymers which dissolves at the desired rate.

It will be appreciated that many of the monomers discussed above will have relatively large molecular weights as compared to dichlorostyrene and that some of them will be liquids and other solids. Dichlorostyrene has rather a high boiling point and acts to suppress undesirable vaporization of volatile monomers with which it is mixed. It is also an excellent solvent for solid monomers such that it may be employed with an extremely large number of monomers ranging from volatile liquids to solid materials, the major requirement being that the monomer either be a liquid or be soluble in dichlorostyrene monomer. As also stated above, mixtures of monomers including dichlorostyrene frequently have a faster polymerization rate than dichlorostyrene itself. It will thus be seen that an extremely large number of polymerizable materials may be employed with dichlorostyrene as the polymerizable monomer component of the dental material or as the polymer with which the monomer component is mixed. The preferred polymerizable materials fall within the class of vinyl compounds including the vinyl acetylene and divinyl compounds, i. e., the butadienes, although as indicated above many other polymerizable monomers may be employed. In general, such polymerizable monomers are characterized by the presence of at least one double bond in a nucleus having not more than approximately twenty carbon atoms, although with certain compounds, for example, the maleinimides, this number may be somewhat exceeded.

While I have described the preferred embodiments of my invention and indicated the various modifications capable of being employed, it is understood that the details of the invention may be varied within the scope of the following claims.

I claim:
1. The method of making dental restorations, which comprises, admixing a liquid polymerizable monomer component with a finely divided solid polymer component, said monomer component containing methyl methacrylate monomer and between 5% and 95% dichlorostyrene monomer in which the chlorine atoms are on the benzene ring, said polymer component comprising methyl methacrylate polymer at least partially soluble in said monomer component, incorporating a peroxide polymerization catalyst with the resulting admixture and fabricating a dental restoration from the resulting mixture in a patient's mouth so that said restoration hardens to a non-porous structure at mouth temperature by polymerization of said monomer component.

2. The method of making dental restorations, which comprises, admixing a liquid polymerizable monomer component with a finely divided solid polymer component, said monomer component containing ethyl ester of butadiene-2-carboxylic acid monomer and between 5% and 95% dichlorostyrene monomer in which the chlorine atoms are on the benzene ring, said polymer component comprising methyl methacrylate polymer at least partially soluble in said monomer component, incorporating a peroxide polymerization catalyst with the resulting admixture and fabricating a dental restoration from the resulting mixture in a patient's mouth so that said restoration hardens to a non-porous structure at mouth temperature by polymerization of said monomer component.

3. The method of making dental restorations, which comprises, admixing a liquid polymerizable monomer component with a finely divided solid polymer component, said monomer component containing methylene diethyl malonate monomer and between 5% and 95% dichlorostyrene monomer in which the chlorine atoms are on the benzene ring, said polymer component comprising methyl methacrylate polymer at least partially soluble in said monomer component, incorporating a peroxide polymerization catalyst with the resulting mixture and fabricating a dental restoration from the resulting mixture in a patient's mouth so that said restoration hardens to a non-porous structure at mouth temperature by polymerization of said monomer component.

4. A dental material for making dental restorations comprising (1) finely divided solid methyl methacrylate polymer and (2) a liquid mixture of from 5% to 95% dichlorostyrene monomer in which the chlorine atoms are on the benzene ring with at least one other monomer selected from the group consisting of methyl methacrylate, ethyl ester of butadiene-2-carboxylic acid, methylene diethyl malonate, alpha methylene ethyl acetoacetate, N-butyl maleinimide, and vinyl acetate.

5. A dental material for making dental restorations comprising (1) finely divided solid methyl methacrylate polymer and (2) a liquid mixture containing methyl methacrylate monomer and between 5% and 95% dichlorostyrene monomer in which the chlorine atoms are on the benzene ring.

6. A dental material for making dental restorations comprising (1) finely divided solid methyl methacrylate polymer and (2) a liquid mixture containing ethyl ester of butadiene-2-carboxylic acid monomer and between 5% and 95% dichlorostyrene monomer in which the chlorine atoms are on the benzene ring.

7. A dental material for making dental restorations comprising (1) finely divided solid methyl methacrylate polymer and (2) a liquid mixture containing methylene diethyl malonate monomer and between 5% and 95% dichlorostyrene monomer in which the chlorine atoms are on the benzene ring.

8. The method of making dental restorations which comprises admixing with finely divided solid methyl methacrylate polymer a liquid mixture of from 5% to 95% dichlorostyrene monomer in which the chlorine atoms are on the benzene ring with at least one other monomer selected from the group consisting of methyl methacrylate, ethyl ester of butadiene-2-carboxylic acid, methylene diethyl malonate, alpha methylene ethyl acetoacetate, N-butyl maleinimide, and vinyl acetate, incorporating a peroxide polymerization catalyst with the resulting admixture and fabricating a dental restoration from the resulting mixture in a patient's mouth so that said restoration hardens to a non-porous structure at mouth temperature by polymerization of said monomer component.

9. A dental material for making dental restorations which comprises a finely divided solid component containing a polymer of an alkyl ester of methacrylic acid, and a liquid component containing a monomeric alkyl ester of methacrylic acid and between 5% and 95% of dichlorostyrene monomer in which the chlorine atoms are on the benzene ring.

FRANCES E. KNOCK.

REFERENCES CITED

The following references are of record in the file of this patent:

UNITED STATES PATENTS

| Number | Name | Date |
|---|---|---|
| 2,318,845 | Feagan | May 11, 1943 |
| 2,335,133 | Renfrow | Nov. 23, 1943 |
| 2,377,041 | Rogover | May 29, 1945 |
| 2,390,437 | Hayes | Dec. 4, 1945 |
| 2,398,736 | Driesbach | Apr. 16, 1946 |
| 2,453,665 | Kropa | Nov. 9, 1948 |
| 2,482,825 | Amos | Sept. 27, 1949 |

FOREIGN PATENTS

| Number | Country | Date |
|---|---|---|
| 498,877 | Great Britain | Mar. 30, 1938 |
| 564,829 | Great Britain | Oct. 16, 1944 |
| 569,684 | Great Britain | June 5, 1946 |